(12) United States Patent
Baird

(10) Patent No.: US 7,707,772 B1
(45) Date of Patent: May 4, 2010

(54) SPRAY CATCHER APPARATUS AND METHOD

(76) Inventor: Russell Alexander Baird, 3767 Bengal Rd., Gulf Breeze, FL (US) 32563

( * ) Notice: Subject to any disclaimer, the term of this patent is extended or adjusted under 35 U.S.C. 154(b) by 259 days.

(21) Appl. No.: 11/702,816

(22) Filed: Feb. 6, 2007

Related U.S. Application Data

(60) Provisional application No. 60/771,649, filed on Feb. 9, 2006.

(51) Int. Cl.
*A01G 27/00* (2006.01)
(52) U.S. Cl. .................................................. 47/48.5
(58) Field of Classification Search ................. 47/48.5, 47/79, 82, 62, 1.5; *A01G 27/00*
See application file for complete search history.

(56) References Cited

U.S. PATENT DOCUMENTS

| | | | | |
|---|---|---|---|---|
| 4,775,104 A | * | 10/1988 | Harkins | 239/314 |
| 4,785,575 A | * | 11/1988 | Shioi | 47/1.3 |
| 4,934,287 A | * | 6/1990 | Guin et al. | 111/7.1 |
| 5,349,997 A | * | 9/1994 | Rial | 141/331 |
| 5,446,993 A | * | 9/1995 | Cullen | 47/48.5 |
| 5,996,279 A | * | 12/1999 | Zayeratabat | 47/48.5 |
| 6,347,479 B1 | * | 2/2002 | Greenberg et al. | 47/48.5 |
| 6,700,486 B1 | * | 3/2004 | Banki | 340/541 |
| 2005/0252988 A1 | * | 11/2005 | Chang | 239/225.1 |

* cited by examiner

*Primary Examiner*—Son T Nguyen
*Assistant Examiner*—Shadi Baniani
(74) *Attorney, Agent, or Firm*—J. Nevin Shaffer, Jr.

(57) ABSTRACT

A spray catcher apparatus and method includes a fluid capture surface where the fluid capture surface is conformed to direct captured fluid from the surface. A support stake includes a first end and a second end and the first end is connected with the fluid capture surface. The second end is placed near an object to which the captured fluid is directed.

7 Claims, 2 Drawing Sheets

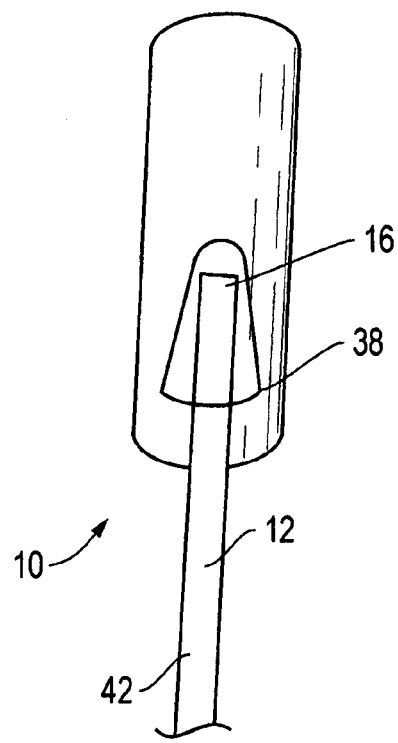
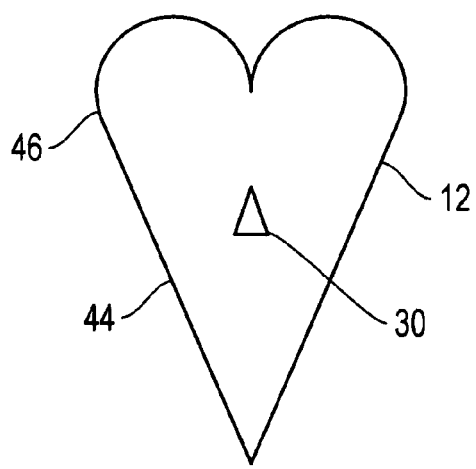
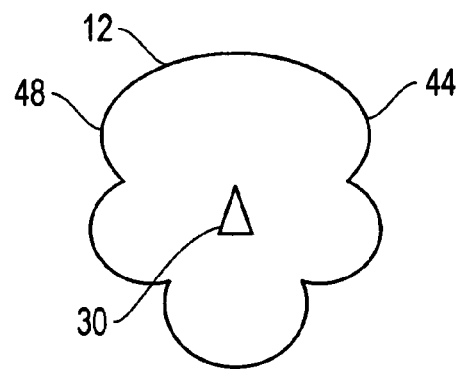
FIG. 3
FIG. 4
FIG. 5

SPRAY CATCHER APPARATUS AND METHOD

CROSS REFERENCE TO RELATED APPLICATION

This application claims the benefit of previously filed U.S. provisional patent application No. 60/771,649 filed Feb. 9, 2006 for a "Spray Catcher". The Applicant hereby claims the benefit of this provisional application under 35 U.S.C. §119. The entire content of this provisional application is incorporated herein by this reference.

FIELD OF THE INVENTION

This invention relates to a spray catcher apparatus and method for use with objects. In particular, in accordance with one embodiment, the invention relates to a spray catcher apparatus including a fluid capture surface where the fluid capture surface is conformed to direct captured fluid from the surface. A support stake includes a first end and a second end and the first end is connected with the fluid capture surface. The second end is placed near an object to which the captured fluid is directed.

BACKGROUND OF THE INVENTION

In any endeavor, the elimination of waste is a useful objective. When large areas with varying sized elements are to be treated with a substance, it is often difficult to apply adequate, but not too much, amounts of the substance to each of the different sized materials. By way of example only and not by limitation, irrigation systems are used to maintain mature plants or new plants but can not adequately maintain a combination of seedlings and mature plants. The seedlings often do not get sufficient water and/or nutrients in the early stages of growth. Irrigation systems, for example, designed to water large established plants may skim over the top of small seedlings and they can struggle to grow or even die through lack of water and nutrients.

Additionally, the application of nutrients, fertilizer for example, and/or weed killers, by an irrigation system is wasteful in that the fertilizer is applied globally to the entire area thus promoting the growth of weeds and requiring, in a kind of vicious circle, the wide application of weed killers. Obviously, there are legitimate ecological concerns that these excess chemicals, fertilizers and weed killers, are finding their way into ground water systems and polluting the environment.

Thus, there is a need in the art for an apparatus and method for the application of material to objects that reduces waste by reducing the amount of material that is applied and that is simple and easy to use. It, therefore, is an object of this invention to provide an apparatus and method for the collection of a portion of material from an existing material application system and the direction of the collected material to a selected object that is inexpensive and simple in construction and use and which cuts down on the excessive use of fertilizers and weed killers.

SUMMARY OF THE INVENTION

Accordingly, a spray catcher apparatus, according to one embodiment of the invention, includes a fluid capture surface where the fluid capture surface is conformed to direct captured fluid from the surface. A support stake with a first end and a second end is provided in which the first end is connected with the fluid capture surface and the second end is placed near an object to which the captured fluid is directed. By way of example only, and not by limitation, an irrigation system for watering plants is a useful illustration of the type of environment in which the invention is intended to be used. The fluid is water and the object is a plant.

According to another aspect of this invention, a holding area is provided in the fluid capture surface in which material to be dispensed is held and over which the captured fluid flows. In one aspect, the material is fertilizer and in another aspect the material is a combination of fertilizer and weed killer.

In accordance with another aspect of the invention, the support stake is a long rectangle in shape with two edges and two sides and the two edges are much smaller in width than the two sides. In another aspect, the fluid capture surface is in the form of an ornamental shape. In another aspect, the ornamental shape is selected from a group including flowers and plant leaves. In other aspects, the fluid capture surface is curved and the fluid capture surface is connected at an angle with said support stake.

According to another embodiment of the invention, a spray catcher apparatus includes a fluid capture surface in which the fluid capture surface is concave along its length and is conformed to direct captured fluid from the surface. A support stake is provided with a first end and a second end and the first end is connected with the fluid capture surface and the second end is placed near an object to which the captured fluid is directed. Additionally, a holding area is provided in the fluid capture surface in which material to be dispensed is held and over which the captured fluid flows. Other aspects of this embodiment include elements similar to those set forth above.

According to another embodiment of the invention, a method of capturing spray includes providing a fluid capture surface in which the fluid capture surface is conformed to direct captured fluid from the surface and a support stake with a first end and a second end where the first end is connected with the fluid capture surface; and placing the second end near an object to which the captured fluid is directed.

In another aspect of the invention a holding area is provided in the fluid capture surface in which material to be dispensed is placed and over which the captured fluid flows. In another aspect, the object is a plant. In a further aspect, the material is selected from a group including fertilizer and weed killer.

DESCRIPTION OF THE DRAWINGS

Other objects, features and advantages of the present invention will become more fully apparent from the following detailed description of the preferred embodiment, the appended claims and the accompanying drawings in which:

FIG. 3 is a back view of the invention of FIG. 1;

FIG. 4 is a front view of an ornamental design for the fluid capture surface in the form of a plant leaf; and FIG. 5 is a front view of an ornamental design for the fluid capture surface in the form of a flower.

DETAILED DESCRIPTION OF THE INVENTION

Figure 1:
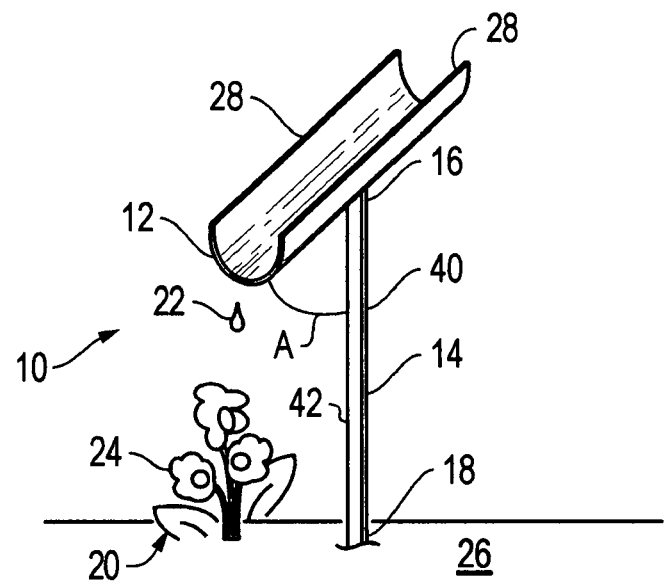
FIG. 1 is a perspective view of the spray catcher apparatus according to one embodiment of the invention.

The preferred embodiment of the present invention is illustrated by way of example in FIGS. 1-5. With specific reference to FIG. 1, a spray catcher apparatus 10, according to one embodiment, includes a fluid capture surface 12. Support stake 14 includes a first end 16 and a second end 18. First end 16 is connected with fluid capture surface 12, as will be discussed more fully hereafter with regard to FIGS. 2 and 3. Second end 18 is placed near object 20 such that fluid 22 captured by fluid capture surface 12 is directed to object 20. Object 20 can be any object now known or hereafter developed to which fluid 22 is to be directed such as, for purposes of example only and not by way of limitation, a plant 24. Likewise, fluid 22 may be any fluid, such as, for example only, water.

By way of explanation and not limitation, object 20 may be a new plant 24 planted in the ground 26. The second end 18 of the stake 14 is placed in the ground 26. Fluid 22, water, from an irrigation system, as known in the art and not shown, would normally mostly miss the small new plant 24. This normally requires a user to take the extra time and effort to hand water new plants to prevent them from dying. Spray catcher 10, as mentioned, is located next to the new plant 24. The height of the fluid capture face 12 is adjusted to optimum levels simply by pushing support stake further or less far into the ground 26. Additionally, the angle and direction of the flow of the fluid 22 from the fluid capture surface 12 is adjustable simply by tilting or angling the support stake 14.

It should be understood that Applicant's invention is useful even without an irrigation system. That is, Applicant's spray catcher apparatus 10 is useful in its own right because it captures rain as well and directs collected rain water in useful amounts to selected objects and plants.

FIG. 1 also illustrates another aspect of the invention in which support stake 14 is connected with fluid capture surface 12 at an angle "A". Any useful angle A may be selected and Applicant has found that a connection angle of approximately forty-five degrees is generally most useful.

FIG. 1 also illustrates another aspect of the invention in which the fluid capture surface 12 is curved along its length. The raised sides 28 of the curve and the curvature of this particular configuration funnel fluid 22 from the raised sides 28 toward the bottom of the curvature thus collecting the fluid 22 for exact deposit on plant 24 as desired. Obviously, fluid capture surface 12 may take on any useful form that collects the fluid 22 for direction to the object 20 as will be discussed more fully, for example, with regard to FIGS. 4 and 5.

Figure 2:
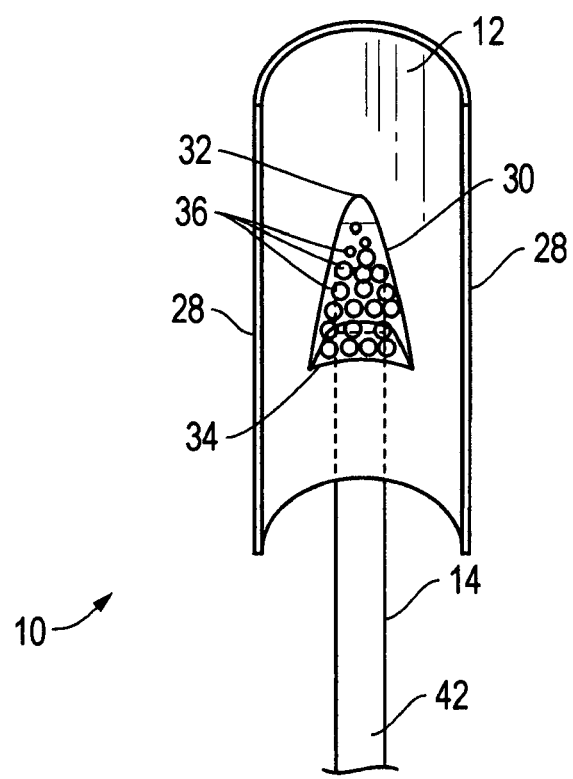
FIG. 2 is a front view of the invention of FIG. 1.

Referring now to FIG. 2, another feature of the spray catcher apparatus 10 of the present invention, according to one embodiment, includes holding area 30 in the fluid capture surface 12. Holding area 30 is a recessed area in the fluid capture surface 12. Preferably, holding area 30 is located on fluid capture surface 12 so as to lay across the path of the captured fluid 22 as it is collected and directed from fluid capture surface 12. As illustrated in FIG. 2, holding area 30 is centered in the bottom of the curvature formed by raised edges 28. Holding area 30 begins with a shallow top section 32 and extends and expands to a deeper bottom section 34 as illustrated. Holding area 30 may be created in any useful form, obviously.

Holding area 30, in any form, is designed so as to retain material 36. Material 36 may be any material deemed useful to the user but is, preferably, fertilizer. Also, material 36 may be weed killer or a combination of fertilizer and weed killer as desired. Any fertilizer and weed killer now known or hereafter developed is adequate for the purposes of the invention. Likewise the material may be in pellet form as illustrated in FIG. 2 or any other solid or liquid form deemed useful.

Referring now to FIG. 3, the back of the spray catcher apparatus 10 is illustrated including stake housing 38. Stake housing 38 is conformed to receive first end 16 of support stake 14. As discussed above, stake housing 38 is preferably formed so as to position fluid capture surface 12 at an angle to support stake 14 when support stake 14 is connected, therewith.

Comparing the view of support stake 14 in FIG. 1 with the view of support stake 14 in FIGS. 2 and 3 illustrates another feature of the invention in which support stake 14 includes two edges 40 and two sides 42 and the two edges 40 are much smaller in width than the two sides 42. Thus, preferably, support stake 14 is in the form of a long, flat, rectangle such as a common tongue depressor or popsicle stick. This feature creates a sturdy support with minimal surface area such that the support stake 14 does not block the application of fluid 22 to surrounding objects 20.

FIGS. 4 and 5 illustrate another aspect of the invention in which fluid capture surface 12 is created in an ornamental design 44. Ornamental design may be any design desired including, for example only and not by limitation, a leaf 46 or a flower 48. Likewise, spray catcher apparatus 10 may be any color, black, green, or realistic color representations of a leaf 46 or flower 48. FIGS. 4 and 5 show that the ornamental designs 44 also may include holding area 30 as discussed above.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A spray catcher apparatus consisting of:
   a. an elongated tubular fluid capture surface having semicircular cross-section, wherein said fluid capture surface is conformed to direct captured fluid from said surface;
   b. a support stake with a first end and a second end, wherein said first end is connected with said fluid capture surface and said second end is placed near an object to which said captured fluid is directed, wherein said support stake is a long rectangle in shape with two edges and two sides, wherein said two edges are much smaller in width than the two sides, wherein said fluid capture surface is connected at an acute angle with said support stake; and
   c. a holding area in said fluid capture surface in which material to be dispensed is held and over which said capture fluid flows, wherein said fluid capture surface is curved and said holding area is centered in the bottom of said curved surface, wherein said holding area is triangular in shape beginning with a shallow and narrow top section that expands to a deeper and wider bottom section.

2. The apparatus of claim 1 wherein said fluid capture surface is in the form of an ornamental shape.

3. The apparatus of claim 2 wherein said ornamental shape is selected from a group including: flowers and plant leaves.

4. A method of capturing spray comprising:
   a. providing a spray catcher apparatus consisting of: an elongated tubular fluid capture surface having semicircular cross-section, wherein said fluid capture surface is conformed to direct captured fluid from said surface; a support stake with a first end and a second end, wherein said first end is connected with said fluid capture surface and said second end is placed near an object to which said captured fluid is directed, wherein said support stake is a long rectangle in shape with two edges and two sides, wherein said two edges are much smaller in width than the two sides, wherein said fluid capture surface is connected at an acute angle with said support stake; and a holding area in said fluid capture surface in which material to be dispensed is held and over which said capture fluid flows, wherein said fluid capture surface is curved and said holding area is centered in the bottom of said curved surface, wherein said holding area is triangular in shape beginning with a shallow and narrow top section that expands to a deeper and wider bottom section;

b. placing said second end near an object to which said captured fluid is directed.

5. The method of claim 4 wherein said object is a plant.

6. The method of claim 4 wherein said material is selected from a group including: fertilizer and weed killer.

7. The method of claim 4 further including the step of placing material in the holding area.

* * * * *